(12) United States Patent
Briggs et al.

(10) Patent No.: US 12,485,775 B2
(45) Date of Patent: Dec. 2, 2025

(54) KINETIC ELECTRIC GENERATOR SYSTEM

(71) Applicants: Shannon Briggs, Pembroke Pines, FL (US); Mark Julian, New Port Richey, FL (US); Luis Medina, New Port Richey, FL (US); Nathaniel Julian, New Port Richey, FL (US); Spencer Mcmanus, Miami Lakes, FL (US); Nick Stocks, Lutz, FL (US)

(72) Inventors: Shannon Briggs, Pembroke Pines, FL (US); Mark Julian, New Port Richey, FL (US); Luis Medina, New Port Richey, FL (US); Nathaniel Julian, New Port Richey, FL (US); Spencer Mcmanus, Miami Lakes, FL (US); Nick Stocks, Lutz, FL (US)

( * ) Notice: Subject to any disclaimer, the term of this patent is extended or adjusted under 35 U.S.C. 154(b) by 0 days.

(21) Appl. No.: 18/830,506

(22) Filed: Sep. 10, 2024

(65) Prior Publication Data

US 2025/0083538 A1    Mar. 13, 2025

Related U.S. Application Data

(60) Provisional application No. 63/628,998, filed on Sep. 11, 2023.

(51) Int. Cl.
*B60L 50/30*    (2019.01)
*F03G 7/08*    (2006.01)
*F16H 57/08*    (2006.01)

(52) U.S. Cl.
CPC .............. *B60L 50/30* (2019.02); *F03G 7/081* (2021.08); *F16H 57/082* (2013.01)

(58) Field of Classification Search
None
See application file for complete search history.

(56) References Cited

U.S. PATENT DOCUMENTS

| | | | | |
|---|---|---|---|---|
| 10,472,034 | B1* | 11/2019 | Webb | B63G 8/14 |
| 2012/0146339 | A1* | 6/2012 | Lee | B60G 7/006 |
| | | | | 290/1 C |
| 2014/0183873 | A1* | 7/2014 | Yoo | H02K 7/1853 |
| | | | | 290/1 C |
| 2021/0070463 | A1* | 3/2021 | Husband | H02J 1/102 |

* cited by examiner

*Primary Examiner* — Rexford N Barnie
*Assistant Examiner* — Joel Barnett
(74) *Attorney, Agent, or Firm* — Ruben Alcoba, Esq

(57) ABSTRACT

A compact harvesting automated motion power (CHAMP) system designed to significantly enhance the driving range of electric vehicles (EVs) through the harnessing of kinetic energy generated by moving parts of the vehicle. This CHAMP system consists of a compact generator unit with a unique attachment mechanism, enabling its integration with various vehicle components that experience regular motion, such as suspension systems, shock absorbers, steering columns, and other movable parts. By capturing and converting this kinetic energy into electrical energy, the CHAMP system contributes to extending the range of EVs, thereby promoting their efficiency and sustainability.

2 Claims, 4 Drawing Sheets

KINETIC ELECTRIC GENERATOR SYSTEM

CROSS REFERENCE

The present application is a continuation application of US Provisional Patent Application No. 63/628,998, titled "Compact Harvesting Automated Motion Power (CHAMP) Electric Vehicle Range Extender.

BACKGROUND

The present invention is directed to a kinetic electric generator system that is used to charge the battery banks of electric vehicles.

Electric vehicles have gained prominence as an environmentally friendly alternative to traditional internal combustion engine vehicles. However, their limited driving range on a single battery charge remains a significant challenge. Extending the range of EVs through innovative means is crucial for encouraging their adoption and addressing the concerns of range anxiety. The present invention provides a system that will extend the range of electric vehicles using kinetic energy.

SUMMARY

The present invention is comprised of the following elements:

Generator Unit: The core component of the CHAMP system is a compact generator unit, measuring approximately 8 inches in length, 4 inches in width, and 4 inches in height. This unit can be of varying sizes and configuration. This unit is designed with advanced materials, including high-efficiency neodymium magnets, specialized coils wound to maximize power output, and a precision-engineered rotor. The generator unit is enclosed in a durable, weather-resistant housing.

Attachment Mechanism: The generator unit is equipped with a protruding shaft approximately 3 inches long and ½ inch in diameter, ending with an attachable bar. This bar and shaft can be of multiple sizes, shapes and lengths. This bar is designed for secure attachment to various vehicle components that undergo regular motion. The attachment mechanism includes adjustable clamps and fasteners to ensure a stable connection.

Installation Flexibility: The CHAMP system offers versatile installation options. Multiple generator units can be strategically installed on various vehicle components simultaneously, allowing for customization based on the specific EV model and driving conditions. The attachment points may include suspension systems, shock absorbers, steering columns, and other moving parts that experience cyclic motion.

Kinetic Energy Harvesting: During normal vehicle operation, kinetic energy is generated as a result of the mechanical motion of the selected vehicle components. The attachable bar connected to the generator unit moves in tandem with the chosen vehicle part, allowing for the capture of kinetic energy without introducing resistance to the vehicle's motion.

Energy Conversion: The kinetic energy harvested is efficiently converted into electrical energy within the generator unit. As the vehicle component to which the attachable bar is connected moves, it induces a relative motion between the powerful neodymium magnets and the specialized coils. This interaction generates an alternating current (AC) within the coils, which is subsequently rectified into direct current (DC) by an integrated rectifier circuit.

Battery Integration: The generated electrical energy is seamlessly rerouted to the EV's high-capacity lithium-ion battery system. The CHAMP system is equipped with intelligent control circuits that continuously monitor the state of the battery. These control circuits regulate the flow of electricity to ensure optimal charging without overloading the battery or causing damage. The controlled charging process contributes to prolonging the battery's lifespan and maximizing energy utilization.

Regulation and Control: The CHAMP system incorporates an advanced control unit equipped with microcontrollers, sensors, and a human-machine interface (HMI). This control unit continuously analyzes the vehicle's speed, driving conditions, and battery status to optimize the energy capture and conversion process. The control unit also enables the user to adjust the CHAMP system's settings and view performance data through an intuitive dashboard display.

Conclusion: The Compact Harvesting Automated Motion Power (CHAMP) system presents an innovative solution to one of the primary challenges faced by electric vehicles—limited driving range. By capturing and converting kinetic energy from moving vehicle components into electrical energy, this system significantly extends the driving range of electric vehicles while maintaining operational efficiency. The invention promotes the broader adoption of EVs and contributes to the development of more sustainable transportation solutions.

DRAWINGS

These and other features, aspects, and advantages of the present invention will become better understood with regards to the following description, appended claims, and drawings where:

Figure 1:
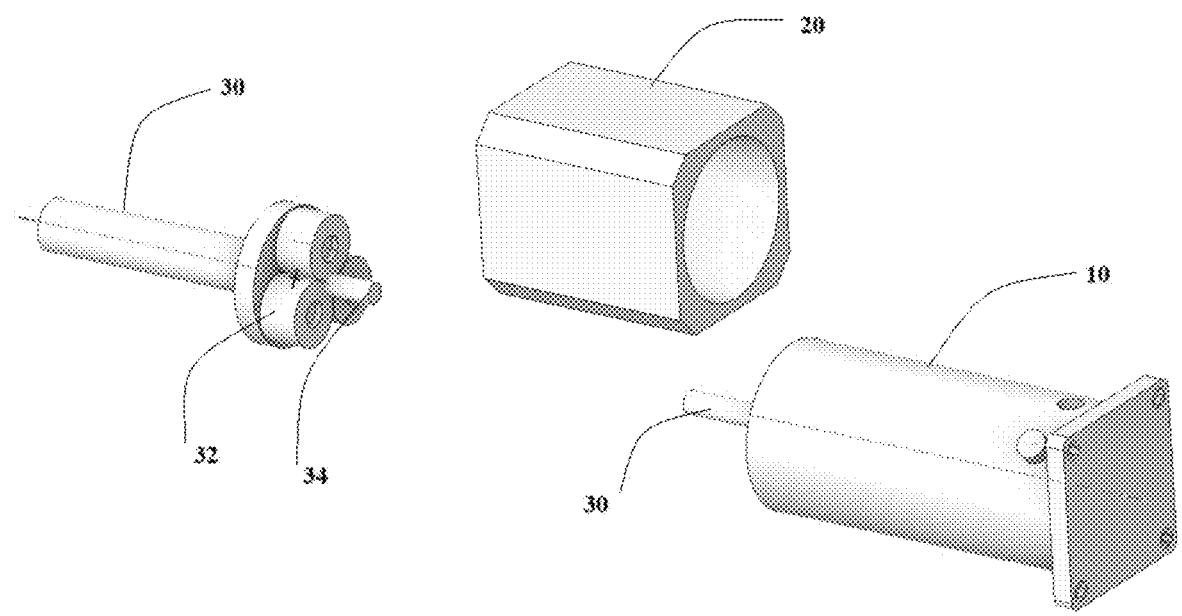
FIG. 1 is an exploded view that shows the three main elements of the present invention.
Figure 2:
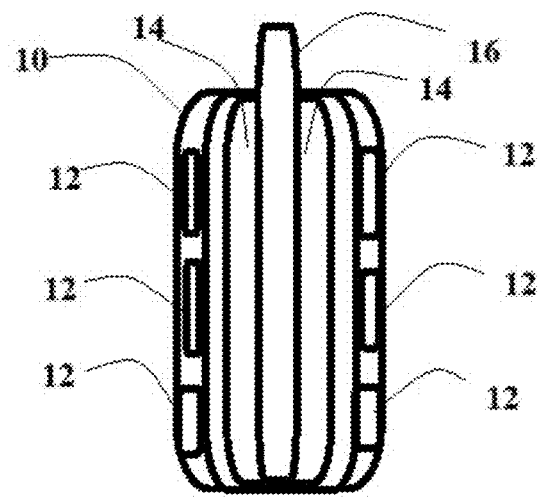
FIG. 2 is a cross section of one embodiment of the electric generator of the present invention.
Figure 3:
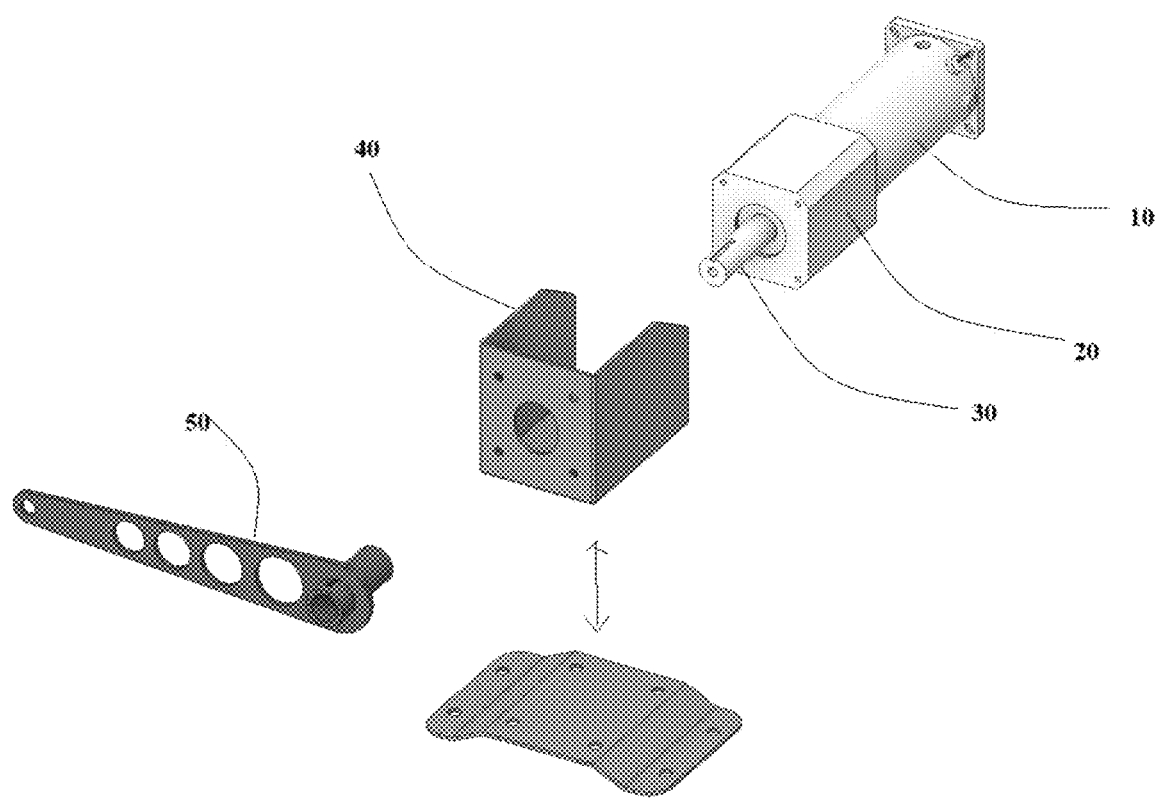
Figure 4:
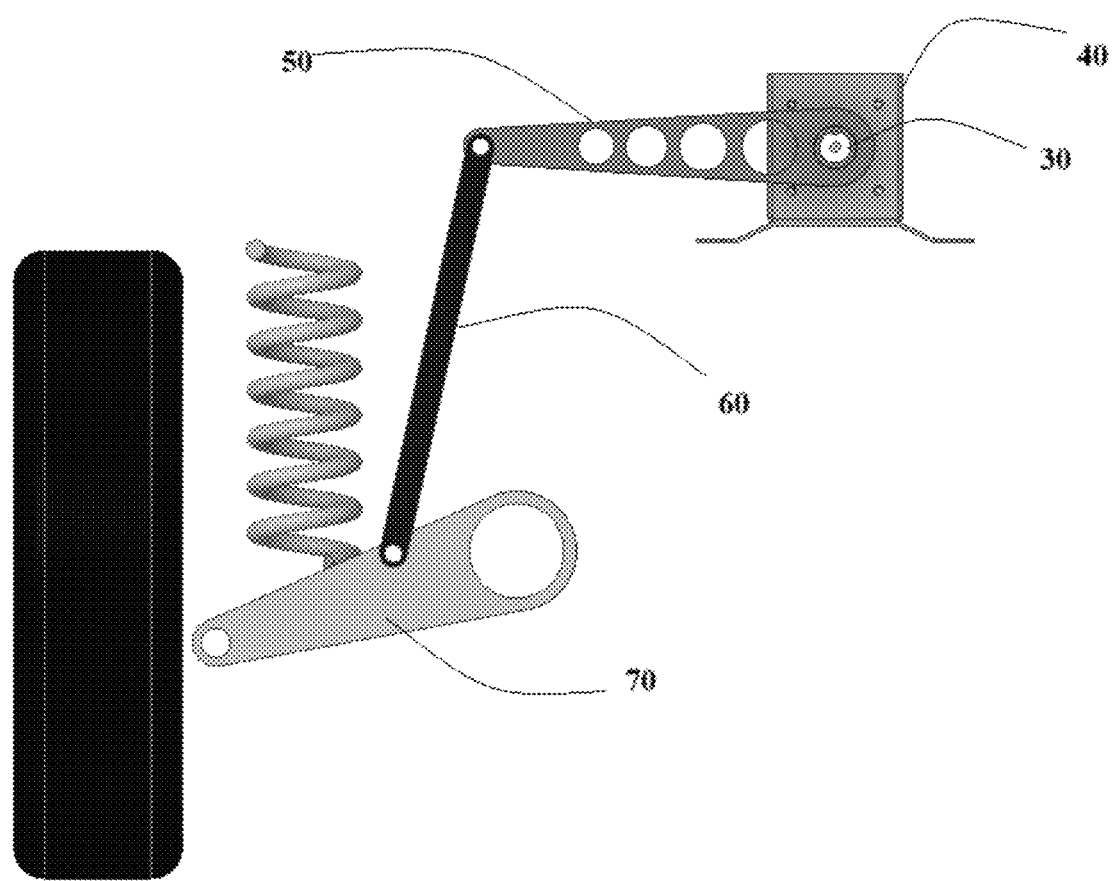
Figure 5:
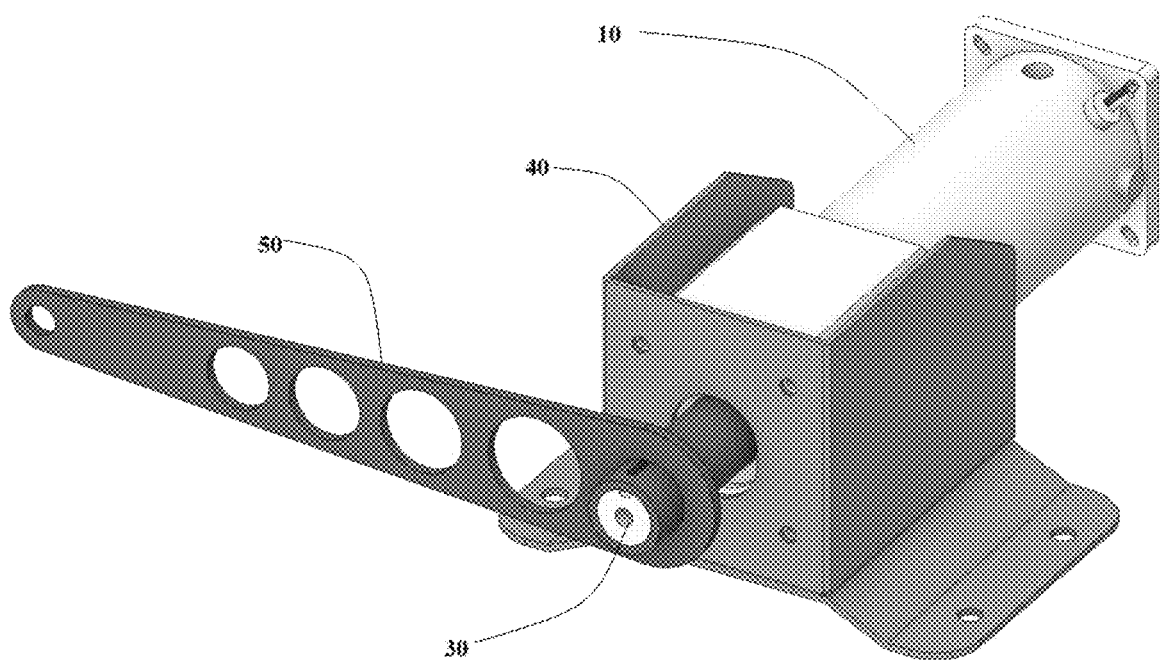

FIG. 3. is an exploded view of the present invention;

FIG. 4 is a front view of the present invention that shows the invention attached to the vehicle suspension of a vehicle; and FIG. 5 is a perspective view of the present invention.

DESCRIPTION

As seen in FIGS. 1-5, the present invention is directed to a kinetic electric generator system that is used to recharge the battery bank of an electric vehicle.

The kinetic electric generator system comprises an electric generator 10 that has neodymium magnets 12 around its inner circumference, that has a coil 14, and that has a rotor 16 attached to the coil 14, the electric generator 10 has and electric energy output line 18 that attaches to an electric vehicle. A ring gear housing 20 that attaches to the electric generator 10. A reciprocating output shaft 30 that has a planet gear system, 32 and a cylinder sun gear 34 that extends outward from the output shaft 30, the cylinder sun gear 34 connects to the rotor 16 of the electric generator 10. An electric generator mount 40 that attaches to the electric generator 10, the electric generator mount 40 attaches to the electric vehicle chassis. A lever 50 that attaches to the reciprocating output shaft 30. And, a rod 60 that attaches to the lever 50, the rod 60 also attaches to the electric vehicle's wheel suspension 70.

In an embodiment of the present invention, the electric generator 10 measures approximately eight inches in length, four inches in width, and four inches in height.

In another embodiment of the present invention, the invention is a compact harvesting automated motion power (CHAMP) system for electric vehicles (EVs), comprising: a. A compact generator unit equipped with high-efficiency neodymium magnets, specialized coils, and a precision-engineered rotor enclosed within a durable and weather-resistant housing; b. An attachable bar with adjustable clamps and fasteners; c. Versatile installation options allowing multiple units to be attached to various EV components that experience regular motion; d. A mechanism for capturing kinetic energy from moving vehicle components; e. An efficient energy conversion system within the generator unit transforming kinetic energy into electrical energy; f. A controlled rerouting system directing the generated electricity to the EV's high-capacity lithium-ion battery system; g. Intelligent control circuits continuously monitoring the battery's status and regulating the flow of electricity for optimal charging; h. A predictive control algorithm that anticipates vehicle speed changes and adjusts energy capture and conversion in real time; i. A user-friendly mobile application providing real-time system performance data.

Advantages of the present invention are as follows:

Significant Range Extension: By capturing and converting kinetic energy from moving vehicle components, the CHAMP system significantly extends the driving range of electric vehicles, mitigating range anxiety.

Efficient Energy Conversion: The generator unit is designed with high-efficiency components, minimizing energy losses during the conversion process.

Customizable Installation: Multiple units can be strategically installed on various vehicle components, making it adaptable for different EV models and driving conditions.

Battery Lifespan Preservation: The intelligent control circuits regulate the flow of electricity, prolonging the battery's lifespan and ensuring safe and efficient charging.

User-Friendly Interface: The CHAMP system includes an intuitive user interface, allowing vehicle owners to adjust settings and monitor system performance conveniently.

What is claimed is:

1. A kinetic electric generator system for electric vehicles, the kinetic electric generator system comprises:
    an electric generator that has neodymium magnets around its inner circumference, that has a coil, and that has a rotor attached to the coil, the electric generator has an electric energy output line that attaches to an electric vehicle;
    a ring gear housing that attaches to the electric generator;
    a reciprocating output shaft that has a planet gear system and a cylinder sun gear extends outward from the output shaft, the cylinder sun gear connects to the rotor of the electric generator;
    an electric generator mount that attaches to the electric generator, the electric generator mount attaches to the electric vehicle chassis;
    a lever that attaches to the reciprocating output shaft; and
    a rod that attaches to the lever, the rod also attaches to the electric vehicle's wheel suspension.

2. The kinetic electric generator system for electric vehicles of claim 1, wherein the electric generator measures approximately eight inches in length, four inches in width, and four inches in height.

* * * * *